United States Patent [19]

Martin et al.

[11] 4,078,188

[45] Mar. 7, 1978

[54] REGENERATIVE-CYCLE INCANDESCENT LAMP CONTAINING A DUAL-ADDITIVE

[75] Inventors: Jack Martin, Paramus; Avinash D. Kulkarni, Montclair, both of N.J.

[73] Assignee: Westinghouse Electric Corporation, Pittsburgh, Pa.

[21] Appl. No.: 671,851

[22] Filed: Mar. 30, 1976

[51] Int. Cl.² .............................................. H01K 1/50
[52] U.S. Cl. .................................. 313/222; 313/223; 313/226; 313/184
[58] Field of Search ........................................ 313/222

[56] References Cited

U.S. PATENT DOCUMENTS

| 2,883,571 | 4/1959 | Fridrich et al. | 313/179 |
| 3,091,718 | 5/1963 | Shurgan | 313/222 |
| 3,384,774 | 5/1968 | English | 313/222 |
| 3,497,754 | 2/1970 | Johnson | 313/222 |
| 3,738,729 | 6/1973 | Coxon et al. | 313/222 X |

FOREIGN PATENT DOCUMENTS

| 131,576 | 9/1968 | Czechoslovakia. |
| 1,928,442 | 12/1969 | Germany. |
| 23,575 | 8/1971 | Japan. |
| 900,200 | 7/1962 | United Kingdom. |
| 952,938 | 3/1964 | United Kingdom. |
| 1,105,291 | 3/1968 | United Kingdom. |

Primary Examiner—James B. Mullins
Assistant Examiner—Darwin R. Hostetter
Attorney, Agent, or Firm—D. S. Buleza

[57] ABSTRACT

The quality and useful life of regenerative-cycle type incandescent lamps that employ iodine as the halogen are enhanced by dosing the lamps with controlled amounts of $SnI_4$ in combination with elemental iodine. Alternative dual-additives that provide iodine-bromine type lamps are $SnI_4$ in combination with a compound such as methylene bromide ($CH_2Br_2$) or mercury bromide which decompose within the energized lamp and release free bromine, and mercury iodide in combination with $CH_2Br_2$. The combined use of two different additives or dosing materials to provide either an iodine or an iodine-bromine atmosphere within the operating lamp permits elongated tubular lamps having singly-coiled filaments to be operated in various non-horizontal burning positions at voltages above their nominal voltage ratings for much longer periods of time than lamps of the same rating and construction that are dosed with a single additive such as elemental iodine, $SnI_4$ or $CH_2Br_2$.

8 Claims, 1 Drawing Figure

U.S. Patent    March 7, 1978    4,078,188
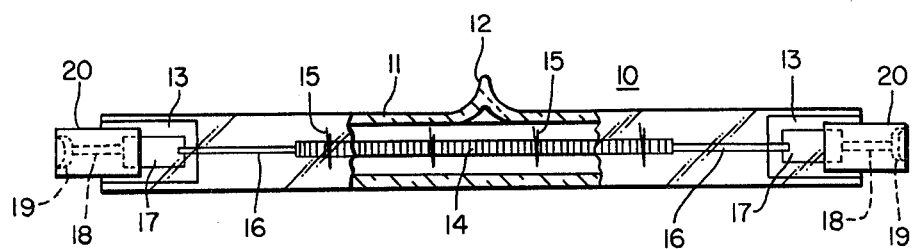

REGENERATIVE-CYCLE INCANDESCENT LAMP CONTAINING A DUAL-ADDITIVE

CROSS-REFERENCE TO RELATED APPLICATIONS

The subject matter of this application is related to and constitutes an improvement over the inventions disclosed and claimed in pending application Ser. No. 643,277, filed Dec. 22, 1975 of A. D. Kulkarni entitled "Regenerative-Cycle Incandescent Lamp Containing $SnI_4$ Additive," and pending application Ser. No. 655,306, filed Feb. 4, 1976 of A. D. Kulkarni and R. E. Newton entitled "Regenerative-Cycle Incandescent Lamp Containing $HgBr_2$ Additive," both of which are assigned to the assignee of the present application.

BACKGROUND OF THE INVENTION

1. Field of the Invention:

This invention generally relates to electric lamps and has particular reference to an improved incandescent lamp of the halogen-cycle type.

2. Description of the Prior Art:

Halogen-cycle incandescent lamps are per se well known in the art. A lamp of this type in which the regenerative-cycle is obtained by dosing the lamp with a small quantity of elemental iodine is described in U.S. Pat. No. 2,883,571 issued Apr. 21, 1959 to Fridrich et al. A method for making an iodine-cycle incandescent lamp in which the iodine is dosed into the envelope in the form of an iodide or hydroiodide of an element of Group IV of the Periodic Table is disclosed in U.S. Pat. No. 3,738,729 issued June 12, 1973 to Coxon et al.

The broad concept of dosing an incandescent lamp with a tin halide (such as $SnI_2$, $SnI_4$, $SnBr_2$, $SnBr_4$, $SnCl_2$ and combinations thereof) to provide iodine, bromine or a mixture of iodine and bromine in combination with a vaporized tin halide in the fill gas is disclosed in Japanese Utility Design Publication No. 1971-23575 dated Aug. 13, 1971 (applied for by Toshiba Electric Company). The lamp is specifically designed to operate with a bulb wall temperature above 500° C in order to surround the incandescent filament with vaporized tin halide so that the latter, by virtue of its high molecular weight, will inhibit the evaporation of tungsten from the filament.

A decorative type incandescent lamp that contains large amounts of elemental iodine (at least 15 milligrams per ml. of bulb volume) either alone or in combination with a vapor of various metallic iodides, including tin iodide and mercury iodide, and is operated in a vertical position to produce a luminescent pulsating colored flame effect is disclosed in U.S. Pat. No. 3,384,774 issued May 21, 1968 to J. F. English.

A high-efficiency type incandescent lamp that contains a tungsten filament, sufficient mercury to provide from 1 to 20 atmospheres of mercury vapor within the operating lamp, and elemental $I_2$, $Br_2$ or $Cl_2$ along with at least one vaporizable metallic halide (including a tin halide) which is wholly or partially converted to the vapor state and is thus thermally excited to cause the metal to emit light emission in its characteristic atomic spectra is disclosed in U.S. Pat. No. 3,497,754 issued Feb. 24, 1970 to P. D. Johnson.

An incandescent lamp that contains a tantalum carbide filament and an atmosphere comprising hydrogen, vaporized carbon, an inert fill gas and one or two halogens (at least one of which is iodine or bromine obtained from a metal halide such as a halide of rubidium, cobalt, tin, silver, cadmium, aluminum, copper, zinc copper, mercury, nickel, and cerium) is disclosed in British Pat. No. 900,200 of Bryant et al.

Tungsten-filament lamps that are dosed with other types of halide compounds (such as $HgI_2$, $HgBr_2$ or mixtures thereof) are disclosed in Czechoslovakian Pat. No. 131,576 of J. Pavlata and in British Pat. Nos. 952,938 and 1,105,291 granted to J. Bowtell et al and J. Moore et al.

A bromine-cycle incandescent lamp that is dosed with a bromine-releasing compound such as hydrogen bromide is disclosed in U.S. Pat. No. 3,091,718 issued May 28, 1963 to J. Shurgan. An incandescent projection type lamp in which the halogen-cycle is obtained by dosing the envelope with predetermined amounts of mercury, elemental bromine and an inert fill gas such as nitrogen is described in German Pat. No. 1,928,442 of B. Kopelman.

Despite the various improvements made in halogen-cycle type incandescent lamps, it has been found that when tubular lamps which have been dosed with elemental iodine in the conventional manner and have long singly-coiled filaments and long design lives (over 1,000 hours nominal) are operated in an upright or slightly tilted position, premature blackening of the top portion of the lamp envelope occurs. The improvement disclosed and claimed in the aforementioned pending application Ser. No. 643,277 of A. D. Kulkarni avoids this problem by dosing the lamp with a carefully controlled amount of $SnI_4$ which reduces the amount of vaporized elemental iodine within the operating lamp to a narrow range (from about 0.05 to 0.20 micromole per ml. of bulb volume). This increases the amount of free iodine that is in the atomic rather than molecular state during operation and permits the lamp to be burned in any position, including a vertical position, without premature bulb blackening.

While such $SnI_4$-dosed incandescent lamps operate satisfactorily in any burning position at the voltages for which they are designed and rated, it has been found that they develop deposits which discolor the lower portions of the lamp envelopes within a short period of time when they are operated in a non-horizontal burning position at voltages that are higher than their rated voltage. This discoloration problem is particularly acute in certain types of photographic equipment and the like which operate the lamps at approximately 112% of their rated voltage in a burning position 30° from vertical in short "on-off" cycles.

Attempts to overcome this problem by dosing the lamps with controlled amounts of elemental iodine (or with various quantities of a compound such as methylene bromide which dissociates within the energized lamp to provide a bromine atmosphere) were not successful. Test lamps dosed with such additives developed deposits which discolored the top portions of the envelopes within short periods of time when the lamps were operated in an upright burning position under the aforementioned cycling and over-voltage conditions.

It would accordingly be very advantageous to provide an elongated halogen-cycle incandescent lamp which would not only permit the lamp to be operated in any position at its rated voltage without exhibiting premature discoloration but which would have a commercially-acceptable life span under extremely adverse operating conditions involving burning the lamp in a non-horizontal position at elevated voltages and in short "on-off" cycles.

SUMMARY OF THE INVENTION

It has been discovered that the above objectives can be obtained in a simple, practical and inexpensive manner by dosing the lamp with two different additives — both of which provide a halogen within the energized lamp and yet coact with one another in such a way that they inhibit discoloration of all segments of the lamp envelope, even when the lamp is burned in non-horizontal positions at elevated voltages and short "on-off" cycles.

In a preferred embodiment, the lamp is dosed with a small controlled amount of $SnI_4$ and with a small quantity of elemental iodine. The "free" iodine released by the dosed $SnI_4$ when the lamp is energized establishes a halogen cycle which prevents the upper portions of the bulb from discoloring during burning under the aforementioned conditions, and the iodine that is dosed into the lamp in elemental form establishes a halogen cycle that prevents discoloration of the lower portions of the lamp envelope when the lamp is operated under such conditions. Thus, even though iodine vapor is provided within the energized lamp by two different additives ($SnI_4$ and elemental iodine), the iodine vapor from such additives apparently does not mix or merge with one another but establishes and sustains independent tungsten-halogen cycles — one of which prevents discoloration of the top portions of the bulb and the other of which prevents discoloration of the bottom portions of the bulb. This is rather surprising since one would expect that the iodine vapor from both additives would admix and be distributed throughout the energized lamp and thus function as a single entity with respect to the control of vaporized tungsten.

The same beneficial "dual" halogen-cycling action can also be obtained in accordance with the invention by dosing the lamp with an iodine-releasing additive such as $SnI_4$ in combination with a bromine-releasing additive such as $CH_2Br_2$. Other suitable dual-additives are mercury iodide in combination with $CH_2Br_2$ and $SnI_4$ in combination with mercury bromide.

BRIEF DESCRIPTION OF THE DRAWING

A better understanding of the invention will be obtained from the exemplary embodiment shown in the accompanying drawing wherein the sole FIGURE is an enlarged side elevational view of a 500 watt T-3 type halogen-cycle incandescent lamp made in accordance with the invention, a portion of the envelope being removed for illustrative purposes.

DESCRIPTION OF THE PREFERRED EMBODIMENT

A representative regenerative-cycle incandescent lamp 10 of the double-ended variety which embodies the present invention is shown in the FIGURE. The lamp 10 has an elongated tubular envelope 11 of suitable light-transmitting material (such as quartz or borosilicate glass or other hard glass which principally comprises fused silica) that has a high melting point and can withstand the elevated operating temperatures involved, as well as the effects of a halogen atmosphere, without becoming deformed or chemically attacked.

The envelope 11 is of circular cross-section and is hermetically sealed by a fused tipped-off segment 12 of an exhaust tubulation and by press seals 13 that are formed at each of its ends. The lamp 10 contains a suitable inert fill gas (such as argon, krypton, xenon, nitrogen or a mixture of such gases at a pressure of at least 1000 torr) and a singly-coiled tungsten filament 14. The filament 14 is suspended in a centrally-located position within the envelope 11 by a series of attached helical support wires 15 of tungsten and by suitable conductor means such as a pair of tungsten (or molybdenum) inner leads 16 that are secured to the ends of the coiled filament and have their opposite ends embedded in the respective press seals 13. The embedded ends of the inner leads 16 are electrically connected to strips 17 of molybdenum ribbon that are also embedded in the respective seals 13 and, in turn, are fastened to outer leads 18 of molybdenum that are terminated by metal contactor buttons 19 which serve as the lamp terminals. The protruding ends of the outer leads 18 and the associated portions of the terminal buttons 19 are protectively enclosed by ceramic sleeves 20 that are secured to the press seals 13 with suitable cement in accordance with standard lamp-making practice.

The coiled filament 14 is wound from wire that is composed essentially of tungsten but which may contain small amounts of thorium and other dopants to improve its strength, etc.

The physical size of the singly-coiled filament 14 relative to that of the tubular envelope 11 is such that the inner surface of the envelope will reach a temperature of at least 250° C when the lamp 10 is operated at its rated voltage (nominal). The lamp 10 is thus quite compact and can be made in a variety of lengths and ratings ranging from 300 watts to 1500 watts. For example, a 500 watt T-3 lamp of the double-ended variety (such as that shown in the FIGURE) which is designed to operate at 120 volts and 4.17 amperes for an average life of 2,000 hours (nominal) has an overall length of 11.8 centimeters, a singly-coiled filament approximately 5 centimeters long and 1.5 millimeter in diameter, a quartz envelope with an outer diameter of approximately 9.5 millimeters, and an internal volume of 2.7 milliliters.

In accordance with the present invention, the envelope 11 is dosed with small but controlled amounts of two separate and different halogen-providing additives which are introduced into the envelope before it is sealed off. In a preferred embodiment a 500 watt T-3 incandescent lamp of the type shown is dosed with 30 microliters of a $SnI_4$ solution which consists of 1.14 grams of $SnI_4$ dissolved in 100 milliliters of benzene. In a separate operation, the lamp is also dosed with approximately 0.17 milligram of elemental iodine before the envelope is tipped off. The foregoing amounts of dosed $SnI_4$ and elemental iodine provided a dosage of 0.202 micromole of $SnI_4$ per milliliter of bulb volume and 0.25 micromole of elemental iodine per milliliter of bulb volume.

The elemental iodine dosage is not critical and can range from about 0.1 to 1.0 micromole of elemental iodine per ml. of bulb volume. The amount of $SnI_4$ dosed into the lamp is also not critical and can range from about 0.05 to 0.6 micromole of $SnI_4$ per milliliter of bulb volume.

The effectiveness of the dual-additive was tested by manufacturing one group of 500 watt T-3 lamps dosed with controlled quantities of $SnI_4$ and elemental iodine as above-described and two other groups of identically-constructed lamps that were dosed with $SnI_4$ alone and elemental iodine alone (in the same amounts as used in the first lamp group). All of the lamps in the test groups were made from the same filament lot. The completed lamps were burned in an upright position (30° from vertical) at 135 volts (15 volts above their design voltage rating of 120 volts) and on a burning cycle of 3 minutes "on" and 1 minute "off". After only 40 hours the upper bulb-portions of the lamps containing only the $I_2$ additive showed noticeable blackening and after 90 hours the bottom bulb-segments of the lamps dosed with only $SnI_4$ became dark and discolored. In contrast, the test lamps containing $SnI_4$ in combination with $I_2$ showed only very slight blackening after 210 hours.

ALTERNATIVE EMBODIMENTS

Excellent results have also been obtained by using a dual-additive consisting of $SnI_4$ in combination with methylene bromide ($CH_2Br_2$). In accordance with this embodiment, lamps of the 500 watt T-3 construction described previously were dosed with 30 microliters of the aforementioned $SnI_4$-benzene solution and with 0.05% (by volume) of $CH_2Br_2$ dispersed in the argon fill gas (the total gas pressure in the sealed lamp was 3 atmospheres or 2280 torr at room temperature). The dosage of the two additives (in terms of bulb volume) were accordingly 0.202 micromole of $SnI_4$ per milliliter of bulb volume and 0.061 micromole of $CH_2Br_2$ per milliliter of bulb volume.

Contrary to the case of elemental iodine, the amount of methylene bromide dosed into the lamp is rather critical and should be carefully controlled. From about 0.03 to 0.1 micromole of methylene bromide per milliliter of bulb volume is preferably employed. The $SnI_4$ dosage can vary over a much wider range, for example from about 0.05 to 0.6 micromole per milliliter of bulb volume.

Comparative tests conducted on three lamp groups demonstrated the clear superiority of the lamps that were dosed with $SnI_4$ in combination with methylene bromide. After 228 hours of testing under the "on-off" cycling, vertically-oriented and over-voltage operating conditions described above, the lamps dosed with the aforementioned specific amounts of $SnI_4$ and $CH_2Br_2$ showed only slight darkening at the bottom of the bulb. In contrast, after only 174 hours of testing the lamps dosed with the same amount of methylene bromide alone were either completely black or blackened over the top half of the bulb. After 174 hours the single lamp containing the same amount of $SnI_4$ alone showed severe blackening over the bottom half of the bulb.

Other dual-additives which can be used in accordance with the invention are tin tetraiodide in combination with mercury bromide, and mercury iodide in combination with methylene bromide.

The combination of $SnI_4$ and mercury bromide provides an additional advantage in that both of these additives are solid materials and can be dissolved in a suitable liquid vehicle, thus permitting the lamps to be dosed by introducing a predetermined quantity of a single solution into the envelope prior to sealing. This would simplify lamp manufacture and provide very accurate control of the amounts of each halogen dosed into the lamps.

While the invention has been illustrated in the form of a double-ended tubular incandescent lamp having a singly-coiled filament, it can also be employed in other types of elongated lamps which contain coiled-coil filaments and have envelopes of such length and cross-section that bulb-discoloration is a problem during operation in non-horizontal burning positions.

We claim as our invention:

1. A regenerative-cycle electric incandescent lamp that is designed to be operated at a selected voltage and have a design life of over 1,000 hours when operated at said voltage, said lamp comprising;

a sealed light-transmitting envelope of elongated configuration that contains an inert fill gas and a filament which is composed essentially of tungsten wire, means supporting said filament in spaced-apart relationship with said envelope, lead-in conductor means extending into said envelope and connected to said filament, and means within said envelope for establishing and sustaining a tungsten-halogen interaction within the lamp during the operation thereof which inhibits discoloration of all portions of the envelope by vaporized tungsten regardless of whether the lamp is operated in a horizontal or non-horizontal position and even when the lamp is operated at a voltage in excess of said selected voltage, said discoloration-inhibiting means consisting essentially of predetermined quantities of two different additives which (a) provide halogen vapors within the lamp when the filament is energized and (b) are selected from the group consisting of $SnI_4$ in combination with elemental iodine, $SnI_4$ in combination with $CH_2Br_2$, $SnI_4$ in combination with mercury bromide, and mercury iodide in combination with $CH_2Br_2$, wherein the $SnI_4$ additive, when used, is present in an amount of at least about 0.05 micromole per milliliter of envelope volume, and wherein the $CH_2Br_2$ additive, when used, is present in an amount within the range of from about 0.03 to 0.1 micromole per milliliter of envelope volume.

2. The incandescent lamp of claim 1 wherein;

said elongated envelope is terminated at each end by an hermetic seal, and said filament is of the singly-coiled type and disposed in substantially centralized and longitudinally-extending position within the envelope.

3. The incandescent lamp of claim 1 wherein said fill gas is a gas of the group consisting of nitrogen, argon, krypton, xenon and mixtures thereof at a pressure of at least 1,000 torr.

4. The incandescent lamp of claim 3 wherein;

said additives are $SnI_4$ in combination with elemental iodine, and the concentration of said additives are such that the lamp, as manufactured, contains from about 0.05 to 0.6 micromole of $SnI_4$ per milliliter of envelope volume and at least 0.1 micromole of elemental iodine per milliliter of envelope volume.

5. The incandescent lamp of claim 4 wherein said lamp, as manufactured, contains from about 0.1 to 1.0 micromole of elemental iodine per milliliter of envelope volume.

6. The incandescent lamp of claim 3 wherein;

said additives are $SnI_4$ in combination with $CH_2Br_2$, and the concentration of the $SnI_4$ additive is such that the lamp, as manufactured, contains from about 0.05 to 0.6 micromole of $SnI_4$ per milliliter of envelope volume.

7. The incandescent lamp of claim 3 wherein said additives are $SnI_4$ in combination with mercury bromide, wherein $SnI_4$ is present in an amount within the range of from about 0.05 to 0.6 micromole per milliliter of envelope volume.

8. The incandescent lamp of claim 3 wherein said additives are mercury iodide in combination with an amount of $CH_2Br_2$ that is within said range.

* * * * *